(12) United States Patent
Will et al.

(10) Patent No.: US 11,646,164 B2
(45) Date of Patent: May 9, 2023

(54) CAPACITOR AND METHOD FOR PRODUCING A CAPACITOR

(71) Applicant: TDK Electronics AG, Munich (DE)

(72) Inventors: Norbert Will, Heidenheim (DE); Fabio Augusto Bueno De Camargo Mello, Munich (DE)

(73) Assignee: TDK ELECTRONICS AG, Munich (DE)

(*) Notice: Subject to any disclaimer, the term of this patent is extended or adjusted under 35 U.S.C. 154(b) by 0 days.

(21) Appl. No.: 16/981,732

(22) PCT Filed: Mar. 26, 2019

(86) PCT No.: PCT/EP2019/057626
§ 371 (c)(1),
(2) Date: Sep. 17, 2020

(87) PCT Pub. No.: WO2019/185653
PCT Pub. Date: Oct. 3, 2019

(65) Prior Publication Data
US 2021/0125789 A1 Apr. 29, 2021

(30) Foreign Application Priority Data
Mar. 27, 2018 (DE) .......... 102018107289.9

(51) Int. Cl.
*H01G 9/008* (2006.01)
*H01G 9/00* (2006.01)
*H01G 9/048* (2006.01)
*H01G 9/02* (2006.01)
*H01G 9/145* (2006.01)

(52) U.S. Cl.
CPC .......... *H01G 9/008* (2013.01); *H01G 9/0029* (2013.01); *H01G 9/048* (2013.01); *H01G 9/02* (2013.01); *H01G 9/145* (2013.01)

(58) Field of Classification Search
CPC .............................. H01G 9/008; H01G 9/012
See application file for complete search history.

(56) References Cited

U.S. PATENT DOCUMENTS

| 2,016,302 A | * | 10/1935 | Sprague | ................ H01G 9/08 361/522 |
| 2,569,925 A | | 10/1951 | Deeley | |
| 2,604,517 A | | 7/1952 | Brennan | |

(Continued)

FOREIGN PATENT DOCUMENTS

| CN | 2512094 Y | 9/2002 |
| CN | 101317242 A | 12/2008 |

(Continued)

*Primary Examiner* — Eric W Thomas
(74) *Attorney, Agent, or Firm* — Slater Matsil, LLP (57) ABSTRACT

A capacitor and a method for producing a capacitor are disclosed. In an embodiment, the capacitor includes a winding having a cathode foil, an anode foil and separators arranged therebetween, an overlap-free region, wherein the cathode foil does not overlap with the anode foil in the overlap-free region, wherein the overlap-free region adjoins an overlapping region, and wherein the cathode foil overlaps with the anode foil in a lateral direction in the overlapping region, and a cathode contact arranged in the overlap-free region, the cathode contact contacting the cathode foil.

15 Claims, 6 Drawing Sheets

(56) References Cited

U.S. PATENT DOCUMENTS

| | | | |
|---|---|---|---|
| 2,932,153 A | | 4/1960 | Bernard et al. |
| 3,010,056 A | * | 11/1961 | Kurland ............... H01G 9/00 361/522 |
| 3,842,325 A | | 10/1974 | Callins et al. |
| 4,509,094 A | | 4/1985 | Finkelstein et al. |
| 4,545,108 A | * | 10/1985 | Adams ............... H01G 9/0029 228/115 |
| 4,987,519 A | | 1/1991 | Hutchins et al. |
| 5,245,513 A | | 9/1993 | Maijers et al. |
| 6,054,233 A | | 4/2000 | Vourlis |
| 6,525,924 B2 | | 2/2003 | Gallay et al. |
| 8,837,115 B2 | | 9/2014 | Ishida |
| 10,096,430 B2 | | 10/2018 | Ashino et al. |
| 10,381,688 B2 | | 8/2019 | Batson et al. |
| 2007/0115611 A1 | * | 5/2007 | Fujimoto ............... H01G 9/151 361/508 |
| 2009/0122467 A1 | | 5/2009 | Hirose et al. |
| 2009/0147444 A1 | | 6/2009 | Takaoka |
| 2009/0246612 A1 | | 10/2009 | Naoi et al. |
| 2009/0279231 A1 | | 11/2009 | Hibi et al. |
| 2009/0310284 A1 | | 12/2009 | Kee |
| 2012/0162859 A1 | | 6/2012 | Yokoo |
| 2012/0243146 A1 | | 9/2012 | Ishida |
| 2014/0036414 A1 | * | 2/2014 | Xu ............... H01G 9/151 361/523 |
| 2015/0243453 A1 | | 8/2015 | Taguchi |
| 2016/0099114 A1 | | 4/2016 | Komatsu et al. |
| 2016/0351966 A1 | | 12/2016 | Batson et al. |
| 2017/0194106 A1 | | 7/2017 | Majima et al. |
| 2018/0005768 A1 | | 1/2018 | Shimizu et al. |

FOREIGN PATENT DOCUMENTS

| | | | |
|---|---|---|---|
| CN | 101604579 A | | 12/2009 |
| CN | 102222568 A | | 10/2011 |
| CN | 102576612 A | | 7/2012 |
| CN | 103268822 A | | 8/2013 |
| CN | 204424092 U | | 6/2015 |
| CN | 205050703 U | | 2/2016 |
| CN | 105940474 A | | 9/2016 |
| CN | 106663538 A | | 5/2017 |
| DE | 1069783 B | | 11/1959 |
| DE | 1925509 A1 | | 11/1969 |
| DE | 2200582 A1 | | 11/1972 |
| DE | 3843653 A | | 6/1990 |
| DE | 4213651 A1 | | 10/1993 |
| DE | 69007279 T2 | | 9/1994 |
| DE | 60030131 T2 | | 3/2007 |
| EP | 0111401 A2 | | 6/1984 |
| EP | 1962306 A1 | | 8/2008 |
| EP | 3109876 A1 | | 12/2016 |
| EP | 2169695 B1 | | 1/2018 |
| EP | 3279910 A1 | | 2/2018 |
| JP | S50-137540 U | | 11/1975 |
| JP | S48034035 U | | 11/1975 |
| JP | 51-009897 B | | 3/1976 |
| JP | S56036139 U | | 4/1981 |
| JP | S58012933 U | | 1/1983 |
| JP | S59-132117 A | | 7/1984 |
| JP | S60-189920 A | | 9/1985 |
| JP | H05251283 A | | 9/1993 |
| JP | H1055936 A | | 2/1998 |
| JP | H10229032 A | | 8/1998 |
| JP | 2007335156 A | | 12/2007 |
| JP | 2009021629 A | | 1/2009 |
| JP | 2009026853 A | * | 2/2009 |
| JP | 2009231551 A | * | 10/2009 |
| JP | 2011159518 A | | 8/2011 |
| JP | 2011233662 A | | 11/2011 |
| JP | 2013149388 A | | 8/2013 |
| JP | WO2014083765 A1 | | 1/2017 |
| JP | 2017504165 A | | 2/2017 |
| WO | 2014083765 A1 | | 6/2014 |

\* cited by examiner

CAPACITOR AND METHOD FOR PRODUCING A CAPACITOR

This patent application is a national phase filing under section 371 of PCT/EP2019/057626, filed Mar. 26, 2019, which claims the priority of German patent application 102018107289.9, filed Mar. 27, 2018, each of which is incorporated herein by reference in its entirety.

TECHNICAL FIELD

The present invention relates to a capacitor, in particular to an electrolytic capacitor. The capacitor has a winding comprising an anode foil, a cathode foil and separators.

BACKGROUND

A capacitor of this kind is described, for example, in European Patent No. 2,169,695. The capacitor can be designed, for example, as an electrolytic capacitor only with a liquid electrolyte, as a polymer electrolytic capacitor with a solid polymer electrolyte or else as a hybrid polymer electrolytic capacitor with a solid polymer electrolyte and a liquid electrolyte.

In electrolytic capacitors, gaps can form between the separator and the cathode foil, these gaps not being filled with the electrolyte and it being possible for potential differences and resulting equalization currents to be produced in said gaps, in particular in the region of a cathode contact strip which bears against the cathode foil. In the region of these gaps, the local electrolytic potential is dominated by the anode foil, and this can lead to changes in potential in these regions of the separator and to as a result to damage, in particular in the event of rapid and pronounced changes in voltage.

SUMMARY

Embodiments provide an improved capacitor and a method for producing a capacitor.

According to a first aspect, a capacitor has a winding having a cathode foil, an anode foil and separators which are arranged therebetween. The foils have an overlap-free region in which the cathode foil does not overlap with the anode foil. In other words, when looking at the unrolled foils, the cathode foil is not covered by the anode foil in the overlap-free region. The overlap-free region adjoins an overlapping region, in which the cathode foil overlaps with the anode foil, in the lateral direction. In this case, the lateral direction is a direction along the unrolled foils perpendicular to the winding axis.

The cathode foil comprises, for example, an aluminum foil which is provided with a coating. The coating is, in particular, a dielectric. The coating is, for example, an aluminum oxide, titanium oxide layer or carbon layer. The cathode foil can have the coating over its entire surface area. The coating is, in particular, homogeneous over the entire surface area. The cathode foil has, in particular, no regions which are not provided with the coating. In this case, only cut edges which are produced when the foil is cut to length are free of the coating. Similarly, the anode foil can comprise an aluminum foil. The anode foil can also have a coating.

The capacitor has a cathode contact for making contact with the cathode foil, which cathode contact is arranged in the overlap-free region. In particular, the cathode contact is not arranged on the cathode foil in an overlapping region.

In this way, the formation of potential differences and resulting equalization currents can be prevented or reduced. Potential differences of this kind are often produced by gaps which can form below or above the cathode contact. If only the anode foil, but not the cathode foil, bears against a separator here, the local electrolyte potential of the separator is dominated by the anode foil and this can result in undesired potential differences in the event of changes in voltage.

The cathode contact is designed, for example, in a strip-like manner and leads into the winding for making contact with the cathode foil. The cathode contact can be connected to a cathode connection for external contact-connection. The anode foil can accordingly be contact-connected to an anode contact. Said connection can be, in particular, a solderable clamping connection (snap-in) or "solder claw capacitor" or a screw connection. A plurality of contacts of this kind can also be connected to one connection here, this also being referred to as a "multi-tab" contact connection.

Within the winding, the overlap-free region can also be identified by way of there being no anode foil present between two layers of the cathode foil which are closest to one another in the radial direction. Only two layers or one layer of the separator are/is arranged between the cathode foils. If the overlap-free region lies radially on the outside of the winding, there is then no anode foil on the outermost layer of the separator here.

In one embodiment, the overlap-free region is arranged on a lateral edge of the cathode foil. Said lateral edge may be the edge which is adjacent to the winding hole in the winding, or is arranged on the side face of the winding. Forming the overlap-free region on a lateral edge of the cathode foil requires only a small amount of additional expenditure. There can also be overlap-free regions on the two lateral edges and contact elements arranged thereon.

In one embodiment, the overlap-free region is arranged between two overlapping regions in the lateral direction. Therefore, when looking at the unrolled foils, there is at least one overlapping region on either side of the overlap-free region. The overlap-free region can be, in particular, a laterally central region of the cathode foil. Therefore, the cathode contact is also arranged centrally and the path resistance is not increased.

The anode foil can be broken down into two separate sub-regions between which the overlap-free region is situated. Since the sub-regions are separated from one another, it is necessary to make electrical contact with the two sub-regions separately, for example by an anode contact in each case.

The anode foil can also have a recess which does not constitute separation of the anode foil. In particular, the recess does not pass from one end-side face as far as the opposite end-side face of the winding. In particular, the overlap-free region adjoins an overlapping region in the direction of the winding axis. In this case, a single anode contact is sufficient for making contact with the anode foil. A plurality of anode contacts can also be provided in order to reduce the path resistance.

Critical gaps on the cathode contact can also be prevented both as seen in a direction radially to the outside and also as seen in a direction radially to the inside, depending on the size of the overlap-free region.

In one embodiment, the overlap-free region extends at most over one layer of the cathode foil in the winding. In other words, the overlap-free region extends at most over one winding length. Therefore, the overlap-free region is not formed in the case of radially adjacent cathode layers of the winding. Therefore, as seen from the cathode contact, only in one radial direction—radially to the outside or radially to the inside—an anode foil does not adjoin the separator layer which is closest to the cathode contact in this radial direction. In the other radial direction, the anode foil adjoins the separator layer which is closest to the cathode contact. Therefore, gaps are prevented only in a radial direction in this case.

In an alternative embodiment, the overlap-free region extends over more than one layer of the cathode foil. In this case, it can be achieved that, as seen from the cathode contact, both in a direction radially to the outside and radially to the inside, an anode foil does not adjoin the separator which is closest to the cathode contact in this direction. Therefore, gaps can be prevented in both radial directions here.

Forming the overlap-free region at the location of the cathode contact is advantageous for a large number of designs.

The capacitor has, in particular, a housing which can be designed in the form of a can. In this case, the housing has a housing base, a housing wall and a housing opening. The housing opening is closed, for example, by a cover.

The cathode contact can be connected to a cathode connection for making electrical contact with the capacitor. In one embodiment, a cathode connection for making contact with the cathode foil and an anode connection for making contact with the anode foil are guided through the cover. This design is also referred to as a radial design.

In a further embodiment, the cathode foil is connected to the cathode connection by means of the cathode contact and the housing. The cathode connection can be designed as a wire which is arranged perpendicularly and centrally in the can base. This design is also referred to as an axial design. An additional or alternative cathode connection includes, for example, a so-called solder star or insert star which is connected to the housing on the side of the housing opening.

The connections can be designed, for example, in the form of so-called "paddle tabs" in which the connection leads from the outside, through the cover, directly into the winding and makes contact with the corresponding foil. In this case, the cathode contact can constitute part of the cathode connection.

A further aspect specifies a method for producing a capacitor. Said capacitor may be, in particular, the above-described capacitor.

The method provides a foil arrangement having a cathode foil, a separator, an anode foil and a further separator. The foil arrangement has an overlap-free region in which the anode foil does not overlap with the cathode foil. In particular, the anode foil only partially covers the cathode foil. A cathode contact for making contact with the cathode foil is arranged in the overlap-free region. The cathode contact is not arranged in an overlapping region in which the anode foil overlaps with the cathode foil. A winding is formed from the foil arrangement.

Further embodiments of the method are disclosed in connection with the above-described capacitor. In particular, all of the properties of the above-described capacitor are disclosed as properties of the method aspect. Furthermore, the capacitor can be produced by the above-described method and have all of the structural and functional properties which have been described in connection with the method.

BRIEF DESCRIPTION OF THE DRAWINGS

The description of the subjects specified here is not limited to the individual specific embodiments. Rather, the features of the individual embodiments can be combined with one another—insofar as this is technically expedient.

The subjects described here will be explained in more detail below with reference to schematic exemplary embodiments.

In the drawings.

DETAILED DESCRIPTION OF ILLUSTRATIVE EMBODIMENTS

In the following figures, parts of the various embodiments that correspond in terms of function or structure are preferably denoted by the same reference signs.

Figure 1:
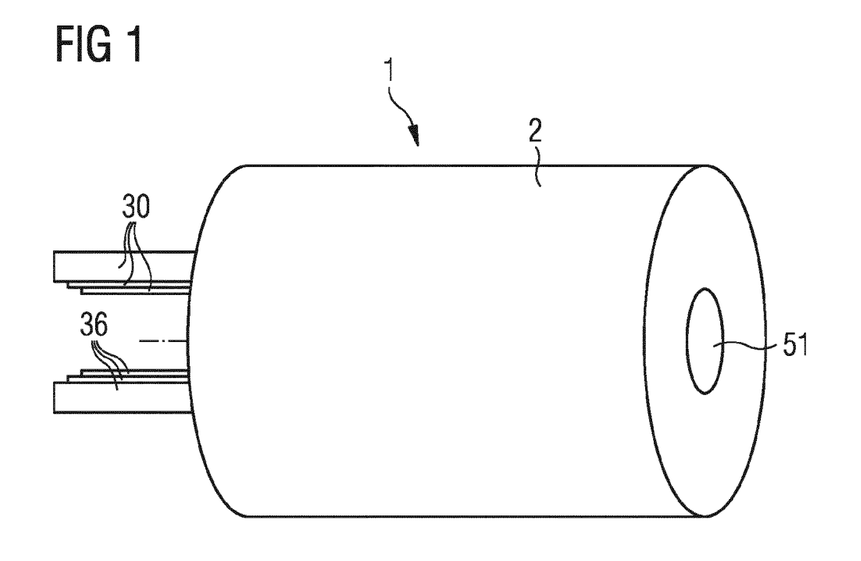
FIG. 1 shows a perspective side view of one embodiment of a capacitor.

FIG. 1 shows an embodiment of a capacitor 1 having a winding 2 comprising cathode foils, anode foils and separators which are arranged therebetween.

The capacitor 1 may be, in particular, an electrolytic capacitor, for example an aluminum electrolytic capacitor. In this case, the separators are impregnated with an electrolyte. Said electrolytic capacitor may also be, for example, a polymer electrolytic capacitor or a hybrid polymer electrolytic capacitor.

Figure 4A:
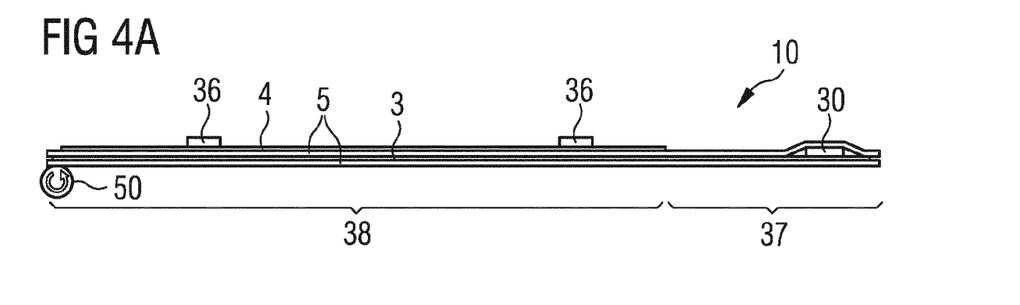
FIGS. 4A, 4B and 4C show an unrolled side view, an unrolled perspective view and a cross section through a wound form of foils of one embodiment of a capacitor.
Figure 4B:
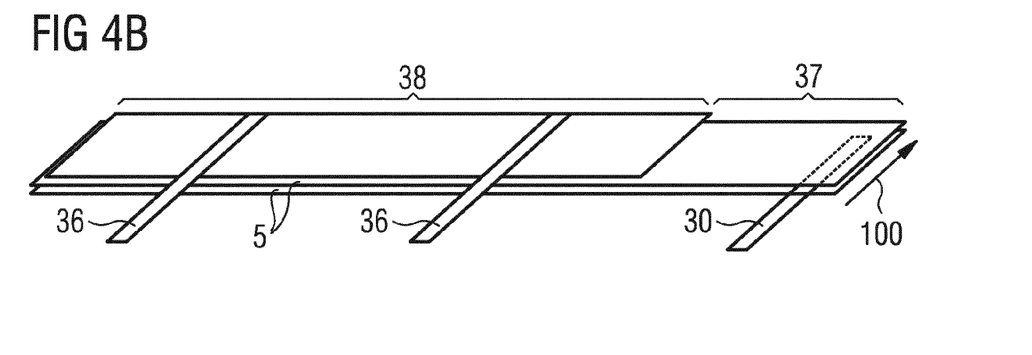
Figure 4C:
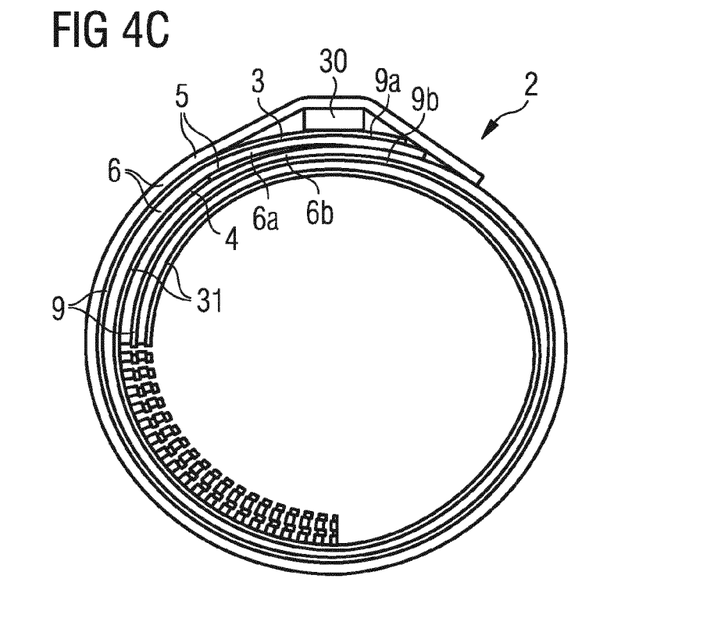

The cathode foils 3, anode foils 4 and separators 5 are arranged in such a way that there is a separator 5 as a spacer between the cathode foil 3 and the anode foil 4 on either side (see FIG. 4C). A winding hole 51, around which the foils 3, 4, 5 are wound, is located in the center of the winding 2.

A plurality of cathode contacts 30 and anode contacts 36 which are electrically connected to the cathode foil 3 and, respectively, to the anode foil 4 in the winding 2 pass out of the winding 2 from an end-side face of the winding 2. In each case only one cathode contact 30 and one anode contact 36 can also be provided. The cathode contacts 30 and anode contacts 36 are designed as strips. The cathode contacts 30 are connected to a common cathode connection (not illustrated here), and the anode contacts 36 are connected to a common anode connection (not illustrated here).

As an alternative, the cathode contacts 30 can also pass out of the winding 2 out of the opposite end-side face of the winding 2 and be electrically contact-connected, for example, to a capacitor housing.

As an alternative, there can also be a connection in the form of so-called "paddle tabs", in which the cathode contacts 30 and, respectively, the anode contacts 36 also directly constitute the external connections.

Figure 2:
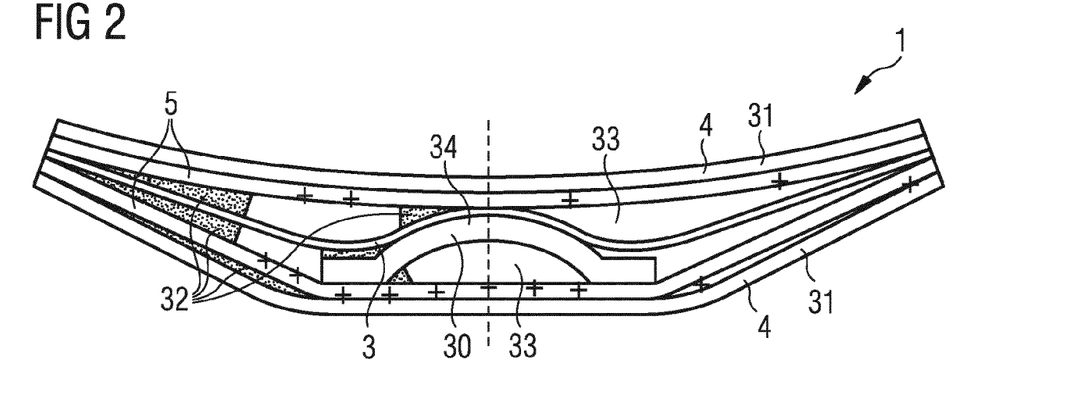
FIG. 2 shows a cross section through a detail of a conventional capacitor for explaining a problem.

A problem with an electrolytic capacitor 1 is explained with reference to FIG. 2. Said figure depicts a cross section through a detail of a capacitor 1. Said capacitor is, for example, the capacitor 1 from FIG. 1.

Shown is here the arrangement of a cathode contact 30 for making electrical contact with the cathode foil 3. The cathode contact 30 is arranged between the cathode foil 3 and a separator 5. The cathode contact 30 is designed in particular in the form of a strip, in particular as a metal strip. Additionally depicted are two layers 31 of the anode foil 4 and a further separator 5. The separators 5 are composed, for example, of paper and are impregnated with a liquid electrolyte 32.

The cathode contact 30 and the cathode foil 3 have a curved portion 34, so that a gap 33 in the form of a tunnel is formed below the cathode contact 30. The curved portion is produced, for example, by cold-welding the cathode contact 30. In addition, there can be further gaps 33 between the separator 5 and the cathode foil 3 and between the separator 5 and the cathode contact 30. In contrast, the anode foil 4 bears largely against the separators 5.

The capacitor 1 is shown in two different states of aging in the present case. To the left of the dashed center line, the capacitor 1 is shown in a new state in which there is enough electrolyte 32 in order to fill the gaps 33 to a sufficient extent. Therefore, a large region of the separator 5 is in electrical contact with the cathode foil 3.

To the right of the dashed line, the capacitor 1 is already older and the gaps 33 are not filled with the electrolyte 32 to a sufficient extent. Therefore, a cavity is formed between the cathode foil 3 or the cathode contact 30 and the separator 5 here. These critical points are marked by crosses. Points of this kind are situated, in particular, in the tunnel-like gap 33 below the cathode contact 30.

Since the cathode contact 30 is not roughened, it has only a low specific surface capacitance and therefore has only a small influence on the separator potential or electrolyte potential in comparison to the anode foil 4. Therefore, the cathode contact 30 can keep the electrolyte 32 at the cathode potential only to a limited extent. Therefore, the region of the separator 5 below the curved portion of the cathode contact 30 is dominated by the anode foil 4. In the event of rapid and pronounced changes in voltage, the electrolyte potential of these regions of the separator 5 also changes. In contrast to the regions which are dominated by the anode foil 4, the electrolyte regions which are in contact with the cathode foil 3 have a virtually constant potential. These potential differences produce equalization currents which can change the capacitor 1 in a manner which is sometimes dangerous.

In particular in the event of high switching loads in use, the capacitors 1 can crack, corrode or deposits which lead to short circuits can form. In particular, copper crystals can form in the separator 5 in the cavities below the cathode foil 3. In addition to this, the gaps 33 can also lead to an increase in the ESR at low temperatures.

Figure 3:
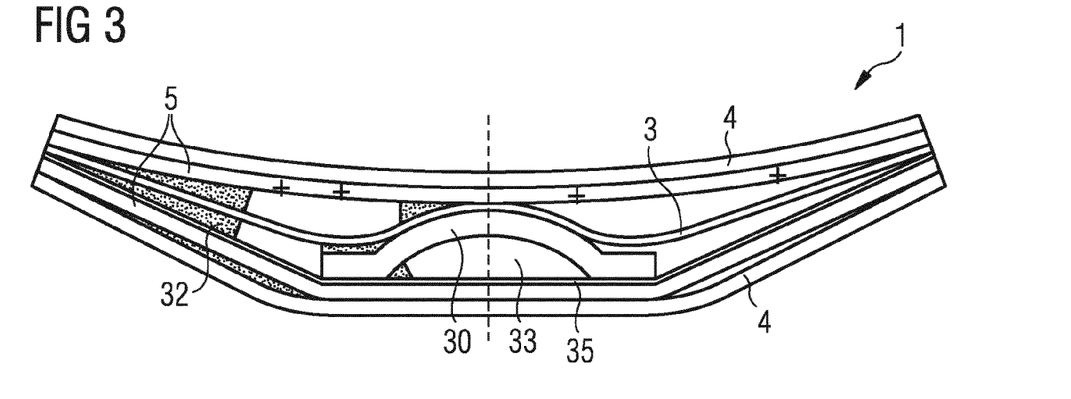
FIG. 3 shows a cross section through a detail of a further conventional capacitor for explaining a problem.

FIG. 3 shows a detail of a capacitor 1 with a conventional measure for solving the above-described problem.

In order to increase the switching strength, the cathode contact 30 is covered by means of an additional cathode foil 35 here such that the cathode contact 30 is arranged between two cathode foils 3, 35 which are at the same potential. The two cathode foils 3, 35 can be electrically conductively connected to one another. However, dynamic coupling by means of surface oxide layers can also be sufficient in order to keep the two cathode foils 3, 35 at the same potential.

In this case too, the capacitor 1 is shown in the new state in the left-hand-side part of the image and the capacitor 1 is shown in the older state in the right-hand-side part of the image. In a new capacitor 1, there is enough electrolyte in order to fill the gaps 33 to a sufficient extent. Therefore, a large region of the separator 5 is in direct electrical contact with the cathode foil 3, so that the potential differences are reduced.

In an older capacitor 1, the gaps 33 are not filled with the electrolyte, so that there are cavities. The lower separator 5 is continuously well connected to the additional cathode foil 35, so that there are no critical points in the lower separator 5.

The upper separator 5 is also partially dominated by the anode foil 4 here. Therefore, the critical points which are marked by a cross remain.

A further advantage of these "double cathode foils" is that no significant currents flow or no flashovers at all are produced on account of the arrangement of the cathode contact 30 between two cathode foils 3, 35 due to the lack of real potential differences. Therefore, electrochemical changes in the electrolyte 32 or the surfaces can be reduced in this region. In addition, no flashover would occur in the event of damage to the separator 5, for example due to burrs, either.

A further, less effective alternative to the "double cathode foils" is that of using a cathode contact 30 with an artificially elevated surface. This cathode contact 30 can then better stabilize the separator 5 or electrolyte 32 which is located in the vicinity to cathode potential.

FIGS. 4A and 4B show an embodiment of a capacitor 1 in a side view of unrolled foils and in a perspective view of the unrolled foils. Therefore, said figures depict a foil arrangement 10 having a separator 5, the cathode foil 3, a further separator 5 and an anode foil 4 which are arranged one above the other, as would be present before the winding process or as would be present after unrolling the foils.

A winding mandrel 50 and there the winding direction of the winding mandrel 50 are illustrated for the purpose of demonstrating the formation of the winding 2 from the foil arrangement 10. Therefore, that region of the foil arrangement 10 which is situated on the far left in the figure comes to rest in the vicinity of the winding hole. That region which is situated on the far right in the figure forms the radially outer edge of the winding 2.

The foil arrangement 10 has an overlap-free region 37 in which the cathode foil 3 is not covered by the anode foil 5. In other words, in a plan view in the unrolled state, there is no overlap of the cathode foil 3 with the anode foil 5 in the overlap-free region 37. The overlap-free region 37 laterally adjoins a region 38 in which the cathode foil 3 and the anode foil 5 overlap. The lateral direction runs horizontally in the figure. The separators 5 and the cathode foil 3 are present in the overlap-free region 37.

The cathode contact 30 is arranged in the overlap-free region 37. In this way, the formation of critical points as described in connection with FIGS. 2 and 3 can be reduced or prevented. In particular, there are fewer gaps 33 in which the separator 5 is in direct contact with the anode foil 4, but not with the cathode foil 3. Ideally, all of the regions of the separator 5 which is impregnated with electrolyte, which regions is contact by the anode foil 4, are also contacted by the cathode foil 3.

Therefore, the cathode contact 30 is not arranged at a point at which the cathode foil 3 overlaps with the anode foil 4. As a result, formation of local electrolyte regions with a different potential can be prevented. This is important particularly in the case of rapid charge-reversal processes or changes in voltage. For example, a capacitor 1 of this kind can be permanently exposed to AC voltages up to the rated voltage if the alternating current does not lead to thermal overloading here.

In addition, it is possible on account of the arrangement of the cathode contact 30 in the overlap-free region 37 to design the separator 5 to be weaker or thinner since it does not have to perform a function of protecting the cathode contact 30 from the anode foil 4. This leads to a further reduction in the ESR.

In addition, "current diversions" and therefore also the ESR are reduced owing to the reduction in gaps between the anode foil 4 and the cathode foil 3. This is significant in particular at low temperatures at which the electrolyte volume can no longer fill the gaps to a sufficient extent.

The capacitor 1 additionally has anode contacts 36 which are arranged at different positions on the anode foil 4. The anode contacts 36 are designed in a strip-like manner. Here, the anode contacts 36 are designed as a multiple contact-connection system of the anode, as is also shown, for example, in FIG. 1 for three anode contacts 36.

In the present case, the overlap-free region 37 extends from an end-side edge of the cathode foil 3, along the winding axis 100, to the opposite end-side edge of the cathode foil 3. However, it is also conceivable for the overlap-free region 37 to not extend as far as the opposite edge.

The overlap-free region 37 is present in a lateral edge region of the cathode foil 3. However, other positions can also be realized, as will be explained later in connection with FIGS. 6A, 6B, 6C and 7. The overlap-free region 37 extends over more than one turn in the winding 2 in the lateral direction. In this case, the gap problem can be avoided in both radial directions. As an alternative, the overlap-free region 37 can extend only over at most one turn in the winding 2, as a result of which the gap problem is then avoided only in one radial direction.

In this case, the overlap-free region 37 can be situated in the winding 2 in a radially outer region of the capacitor 1 or in a central region of the capacitor 1, irrespective of which lateral edge the region 37 is formed on. The radial direction runs perpendicularly to the winding axis 100 in the winding 2. The lateral direction runs in a spiral manner along a foil in the winding 2.

On account of the arrangement of the cathode contact 30 on the lateral edge of the cathode foil 3, the path resistance of the cathode foil 3 increases in comparison to an arrangement centrally on the cathode foil 3. This can be accepted if the switching strength of the capacitor 1 is important and the path resistance is less so or if the capacitor 1 is so small that the path resistance is negligible.

FIG. 4C shows a cross section through the foil arrangement from FIGS. 4A and 4B in wound form. Only an outer region of the winding 2 is shown here. The anode contacts 36 are not depicted here.

A plurality of layers 9 of the cathode foil 3 (also referred to as cathode layers 9), layers 6 of the separators 5 (also referred to as separator layers 6) and layers 31 of the anode foil 4 (also referred to as anode layers 31) are depicted. In this case, the region of a foil which is arranged within a winding is referred to as a "layer". Various layers are regions of a cathode foil and, respectively, an anode foil and, respectively, of the separators which are arranged one above the other in the radial direction. In the separator layers, the two separators are not considered separately, so that two separator layers can belong to one of the separators or to different separators.

Owing to the formation of the overlap-free region 37, the cathode contact 30 is covered from the outside only by a separator foil 5, but not by the anode foil 4. The overlap-free region 37 extends over more than one winding. In other words, the overlap-free region 37 extends over more than one cathode layer 9. In particular, the overlap-free region 37 is present in the cathode layers 9a, 9b which are closest to one another. Therefore, there is no anode foil 4 between two closest separator layers 6a, 6b here.

In particular, an anode foil 4 does not adjoin the separator layer 6a which is closest to the cathode contact 30 in a direction radially to the inside.

Therefore, in the winding 2, the sequence of the layers 6, 9, 31 in the radial direction from the outside to the inside in the region of the cathode contact 30 is as follows: separator layer 6-cathode contact 30-cathode layer 9a-separator layer 6a-separator layer 6b-cathode layer 9b-separator layer 6-anode layer 31, and so on.

It is also possible to design the separators 5, for example to provide said separators with recesses, in such a way that two separator layers 6a, 6b do not adjoin one another, but rather only one separator 5 is arranged between the two adjacent cathode layers 9a, 9b.

If the overlap-free region does not extend from the cathode contact 30 over more than one turn, the anode foil 4 adjoins the separator layer 6a which is closest to the cathode contact 30 in a direction radially to the inside. In this case, the gap problem is eliminated only in one radial direction, in particular radially to the outside. This may be sufficient for certain cases already.

In this case, the arrangement of the layers 6, 9, 31 in the radial direction from the outside to the inside in the position of the cathode contact 30 is as follows: separator layer 6-cathode contact 30-cathode layer 9a-separator layer 6a-anode layer 31, separator layer 6, cathode layer 9, and so on.

Figure 5:
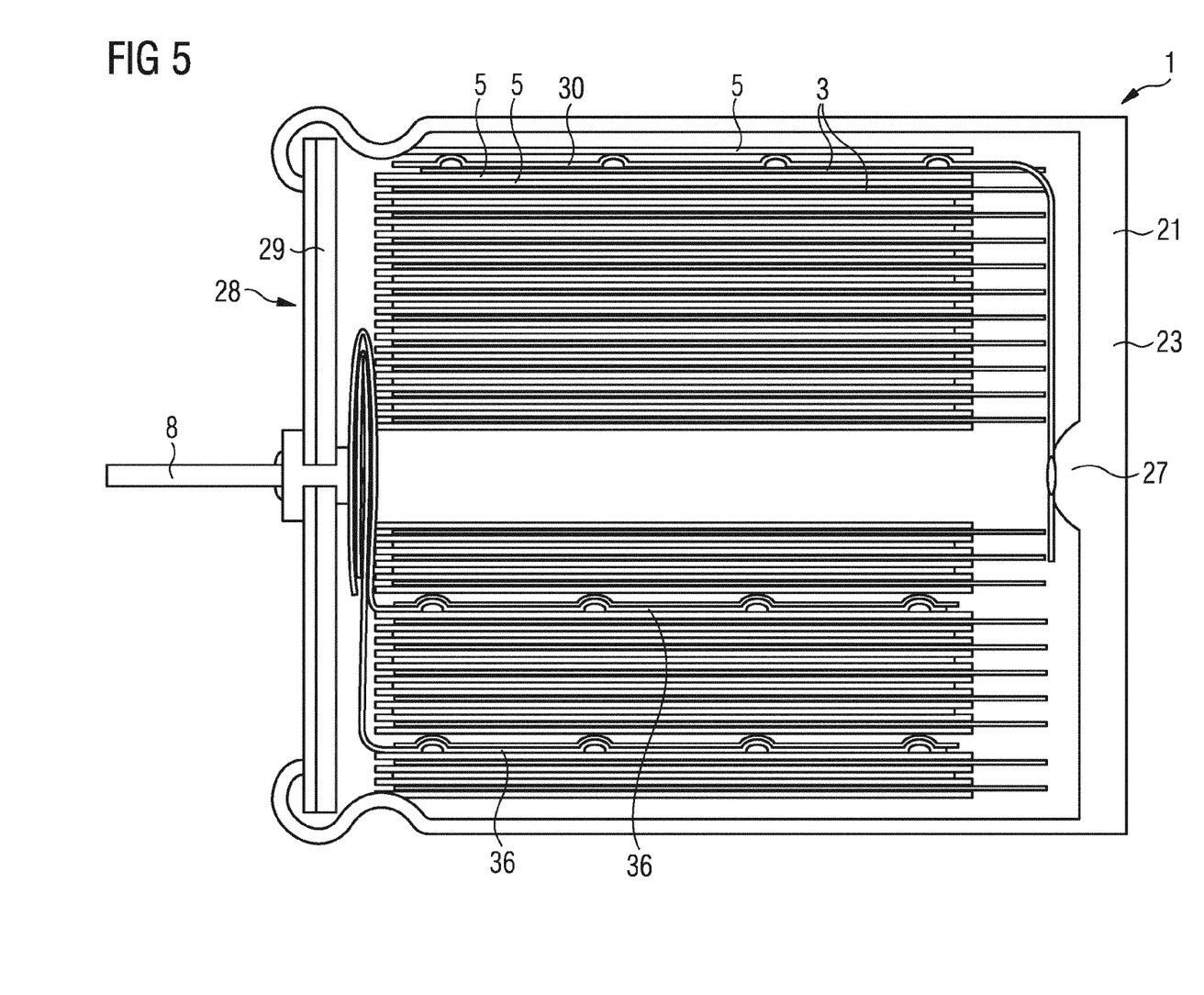
FIG. 5 shows a longitudinal section through a further embodiment of a capacitor.

FIG. 5 shows a longitudinal section through a further embodiment of a capacitor 1.

In the present case, the housing 21 in which the winding 2 is arranged is also illustrated. The housing 21 is designed, in particular, as a can with a base 23 and a housing opening 28. The housing opening 28 is closed by a cover 29. Said cover may be a rubber plug and a hard paper disk. The anode contacts 36 are connected to an anode connection 8 by means of bushings through the cover 29.

In contrast to the embodiment of FIGS. 4A, 4B and 4C, the cathode contact 30 leads out at the other end-side face of the winding 2 than the anode contacts 36. The cathode contact 30 is bent in the direction of the winding center outside the winding 2. In particular, the cathode contact 30 leads to a raised portion 27 in a central region in the base 23 of the housing 21 and is electrically connected, in particular welded, to the housing 21 there.

The cathode connection can be designed as a wire which is arranged perpendicularly and centrally in the can base. This design is also referred to as an axial design. An additional or alternative cathode connection includes, for example, a so-called solder star or insert star which is connected to the housing on the side of the housing opening.

Figure 6A:
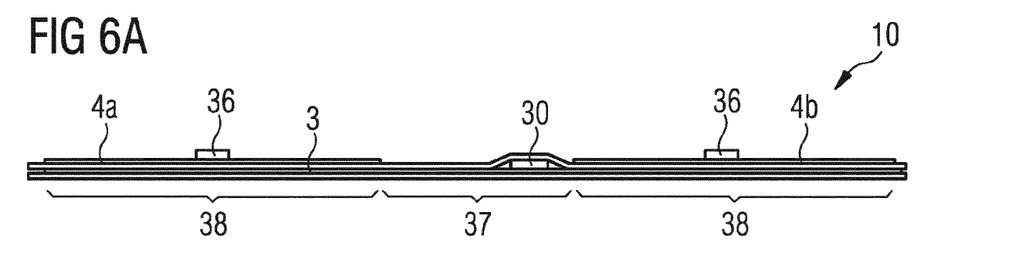
FIGS. 6A, 6B and 6C show a side view and a perspective view and a cross section through a wound form of unrolled foils of a further embodiment of a capacitor.
Figure 6B:
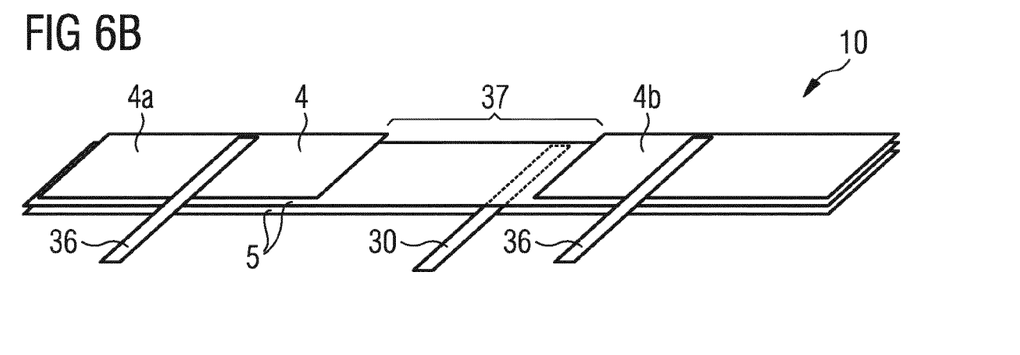

FIGS. 6A and 6B show a side view and a perspective view of a further embodiment of a capacitor illustrated by a foil arrangement 10 of the unrolled foils.

In contrast to the embodiment of FIGS. 4A, 4B and 4C, the overlap-free region 37 in which the cathode contact 30 is arranged is not located at the lateral edge of the cathode foil 3, but rather in a laterally central region of the cathode foil 3. Overlapping regions 38 in which the anode foil 4 overlaps with the cathode foil 3 adjoin either side of the overlap-free region 37.

The overlap-free region 37 extends from an end-side edge of the foils as far as the opposite end-side edge of the foils here too.

Therefore, the anode foil 4 is broken down into two partial foils 4a, 4b which are not connected to one another. In this case, it is necessary to separately contact-connect each partial foil 4a, 4b to an anode contact 36.

Owing to the central arrangement of the cathode contact 30, the path resistance (ESR) changes only slightly in this design.

The overlap-free region 37 extends over more than one turn in a lateral direction as seen from the cathode contact 30. In this case, the gap problem can be eliminated in both radial directions.

Figure 6C:
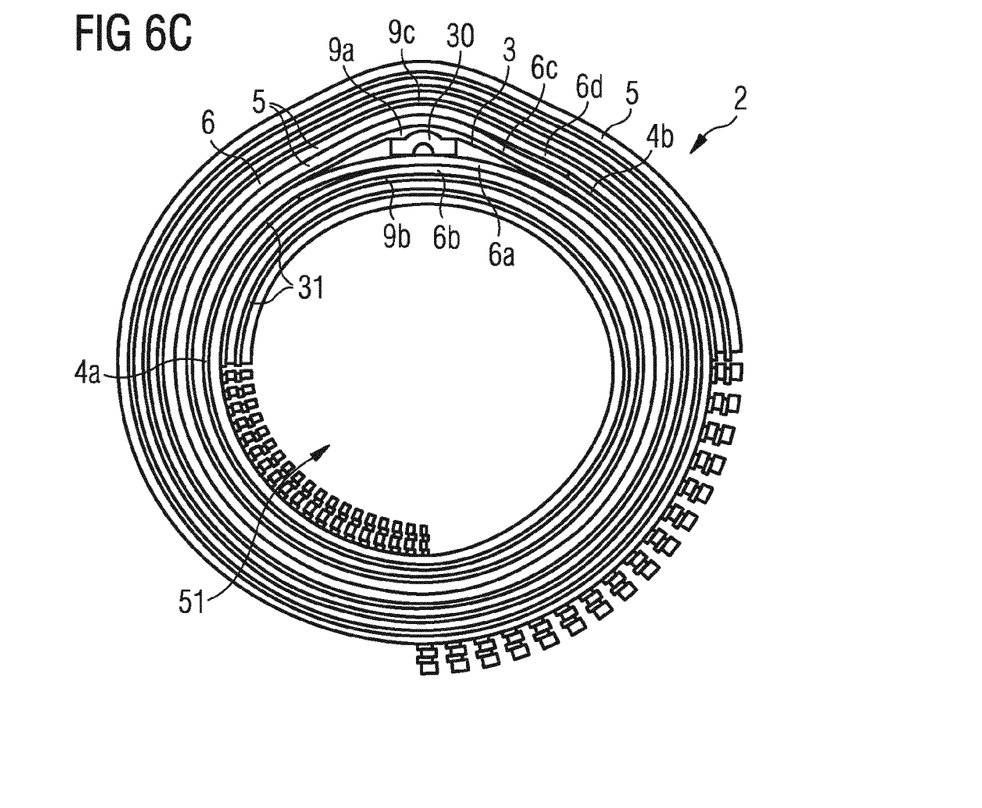

FIG. 6C shows a cross section through the foils in wound form. In contrast to the embodiment of FIG. 4C, the cathode contact 30 is arranged between a large number of separator layers 6, cathode layers 9 and anode layers 31 in both lateral directions. Furthermore, in contrast to FIGS. 4A-4C, the winding is designed with a winding mandrel, which is situated above the foil arrangement 10 in FIG. 6A, here. In an alternative embodiment, the winding is designed with a winding mandrel which is situated below the foil arrangement 10.

There is no anode foil 4 between the cathode layer 9a against which the cathode contact 30 bears and the cathode layers 9b, 9c, which are closest to said cathode contact to the outside and to the inside, in the region of the cathode contact 30 in the wound state.

Instead of this, in each case two separator layers 6a, 6b and, respectively, 6c, 6d bear directly against one another. In particular, two separator layers 6a, 6b are directly adjacent to one another in a manner adjoining the cathode contact 30 in the radial direction to the inside, that is to say as seen in the direction of the winding hole 51, so that neither a cathode layer 9 nor an anode layer 31 is arranged therebetween. The separator layers 6c, 6d which are closest to the cathode contact 30 are directly adjacent to one another as seen in the radial direction to the outside too.

Furthermore, there is no anode foil 4 respectively between the cathode layer 9a against which the cathode contact 30 bears and the cathode layers 9a, 9b, which are closest to said cathode contact in the radial direction to the inside and the outside, in the region of the cathode contact 30.

As an alternative to the extent of the overlap-free region 37 over the circumference of the winding 2, the overlap-free region 37 can also be of narrower design at the location of the cathode contact 30 and a further overlap-free region 37 can be provided in a position which is arranged below or above the cathode contact 30 in the winding 2.

Figure 7:
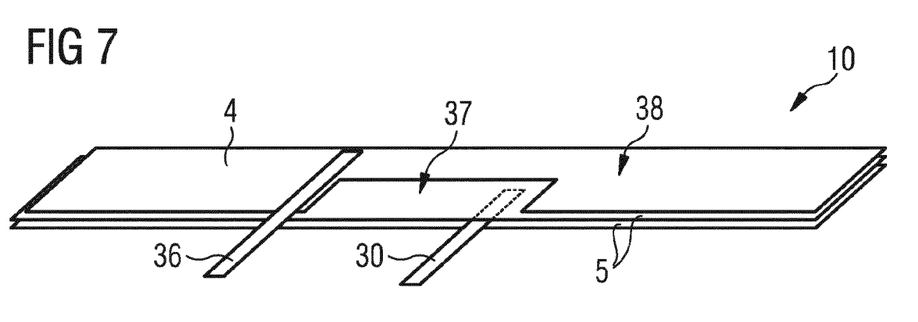
FIG. 7 shows a perspective view of unrolled foils of a further embodiment of a capacitor.

FIG. 7 shows a perspective view of a further embodiment of a capacitor illustrated by unrolled foils.

In contrast to the embodiment of FIGS. 6A and 6B, the overlap-free region 37 is not completely formed by a first end-side edge to the opposite end-side edge, but rather leads only slightly along from the first end-side edge in the direction of the opposite edge. For example, the overlap-free region 37 is formed by stamping out a region of the anode foil 4. Therefore, the overlap-free region 37 is formed by a recess in a coherent anode foil 4.

Here, the cathode contact 30 is shortened in comparison to the cathode contact 30 of FIG. 6A, so that said cathode contact does not pass into the overlapping region 38.

Therefore, the anode foil 4 is not broken down into separate parts here, so that a single anode contact 36 is sufficient for making contact with the anode foil 4. A plurality of anode contacts 36 can also be provided here in order to reduce the path resistance.

The capacitor 1 can also have a plurality of overlap-free regions 37, for example even a combination of overlap-free regions 37 at the lateral edge, for example according to FIG. 4A, and in the central position, for example according to FIG. 6A or 7.

The invention claimed is:

1. A capacitor comprising:
   a winding comprising a cathode foil, an anode foil and separators arranged therebetween;
   an overlap-free region,
   wherein the cathode foil does not overlap with the anode foil in the overlap-free region,
   wherein the overlap-free region adjoins an overlapping region,
   wherein the cathode foil overlaps with the anode foil in a lateral direction in the overlapping region,
   wherein the overlap-free region extends over more than one layer of the cathode foil, and
   wherein the lateral direction is a direction from the overlap-free region along the anode foil perpendicular to a winding axis;
   a cathode contact arranged in the overlap-free region, the cathode contact contacting the cathode foil; and
   one or more anode contacts contacting the anode foil, wherein the one or more anode contacts are connected to a common anode terminal.

2. The capacitor as claimed in claim 1, wherein the overlap-free region is arranged on a lateral edge of the cathode foil.

3. The capacitor as claimed in claim 1, wherein the overlap-free region is arranged between two overlapping regions in the lateral direction.

4. The capacitor as claimed in claim 3, wherein the anode foil has two separate subregions between which the overlap-free region is situated.

5. The capacitor as claimed in claim 1, wherein the overlap-free region extends from an end-side face to an opposite end-side face of the winding, and wherein the end-side face and the opposite end-side faces are arranged at opposite ends of the winding along a direction of the winding axis.

6. The capacitor as claimed in claim 1, wherein the overlap-free region adjoins the overlapping region in a direction along the cathode foil parallel to the winding axis.

7. The capacitor as claimed in claim 1, wherein no anode foil is arranged between two radially closest layers of the cathode foil as seen in a radial direction to an outside or an inside from the cathode contact.

8. The capacitor as claimed in claim 7, wherein no anode foil is arranged between the two radially closest layers of the cathode foil as seen in the radial direction to the outside and the inside from the cathode contact.

9. The capacitor as claimed in claim 1, wherein at least two of the separators directly adjoin one another, without the anode foil being arranged therebetween, as seen in a radial direction to an outside or an inside from the cathode contact.

10. The capacitor as claimed in claim 1, wherein at least two of the separators directly adjoin one another, without the anode foil being arranged therebetween, as seen in a radial direction to an outside and an inside from the cathode contact.

11. The capacitor as claimed in claim 1, wherein the cathode contact is electrically contact-connected to a housing.

12. The capacitor as claimed in claim 1, wherein the capacitor has a plurality of cathode contacts arranged in overlap-free regions.

13. A method for producing a capacitor, the method comprising:
   providing a foil arrangement having a cathode foil, a separator, an anode foil and a further separator,
   wherein a cathode contact is arranged on the cathode foil and contacting the cathode foil,
   wherein the foil arrangement has an overlap-free region in which the anode foil does not overlap with the cathode foil,
   wherein the overlap-free region adjoins an overlapping region,
   wherein the cathode foil overlaps with the anode foil in a lateral direction in the overlapping region,
   wherein the lateral direction is a direction from the overlap-free region along the anode foil perpendicular to a winding axis, and
   wherein the cathode contact is arranged in the overlap-free region, wherein the overlap-free region extends over more than one layer of the cathode foil; and
   forming a winding from the foil arrangement,
   wherein the capacitor comprises one or more anode contacts contacting the anode foil, and
   wherein the one or more anode contacts are connected to a common anode terminal.

14. A capacitor comprising:
   a winding comprising a cathode foil, an anode foil and separators arranged therebetween; and
   an overlap-free region,
   wherein the cathode foil does not overlap with the anode foil in the overlap-free region,
   wherein the overlap-free region extends over more than one layer of the cathode foil,
   wherein the overlap-free region adjoins an overlapping region,
   wherein the cathode foil overlaps with the anode foil in a lateral direction in the overlapping region,
   wherein the lateral direction is a direction from the overlap-free region along the anode foil perpendicular to a winding axis, and
   wherein the overlap-free region is arranged on a lateral edge of the cathode foil.

15. A capacitor comprising:
   a winding comprising a cathode foil, an anode foil and separators arranged therebetween; and
   an overlap-free region,
   wherein the overlap-free region extends over more than one layer of the cathode foil,
   wherein the cathode foil does not overlap with the anode foil in the overlap-free region,
   wherein the overlap-free region adjoins an overlapping region,
   wherein the cathode foil overlaps with the anode foil in a lateral direction in the overlapping region,
   wherein the lateral direction is a direction from the overlap-free region along the anode foil perpendicular to a winding axis, and
   wherein the overlap-free region adjoins the overlapping region in a direction along the cathode foil parallel to the winding axis.

* * * * *